United States Patent [19]

Fogarty et al.

[11] Patent Number: 4,547,802
[45] Date of Patent: Oct. 15, 1985

[54] TV SCRAMBLER/DESCRAMBLER USING SERIAL MEMORIES

[75] Inventors: John D. Fogarty, Columbia, Md.; Gerald M. Borsuk, Washington, D.C.

[73] Assignee: Westinghouse Electric Corp., Pittsburgh, Pa.

[21] Appl. No.: 490,263

[22] Filed: Apr. 29, 1983

[51] Int. Cl.[4] .................. H04N 7/16; H04K 1/06
[52] U.S. Cl. .................. 358/119; 178/22.19; 178/22.04; 358/123
[58] Field of Search .......... 358/119, 123, 120, 114; 178/22.04, 22.05, 22.06, 22.19

[56] References Cited

U.S. PATENT DOCUMENTS

| | | | |
|---|---|---|---|
| 4,070,693 | 1/1978 | Shutterly | 358/123 |
| 4,087,626 | 5/1978 | Brader | 178/22.19 |
| 4,232,193 | 11/1980 | Gerard | 178/22.04 |
| 4,405,942 | 9/1983 | Block et al. | 358/119 |

*Primary Examiner*—S. C. Buczinski
*Assistant Examiner*—Burton J. Carniol
*Attorney, Agent, or Firm*—J. B. Hinson

[57] ABSTRACT

Apparatus for scrambling and descrambling the video portion of TV signals is disclosed. The video portion of the TV signal is stored in a serial memory such as a charge coupled device. Scrambling is accomplished by shifting the end portion of the lines of video to the beginning by recirculating the data stored in the charge coupled devices for a portion of a line of the video signal. Two charge coupled devices are provided so that when the data stored in one device is being recirculated for scrambling the subsequent line can be stored in a second device. Descrambling is an inverse operation and is accomplished in essentially identical hardware.

8 Claims, 4 Drawing Figures

FIG. 1

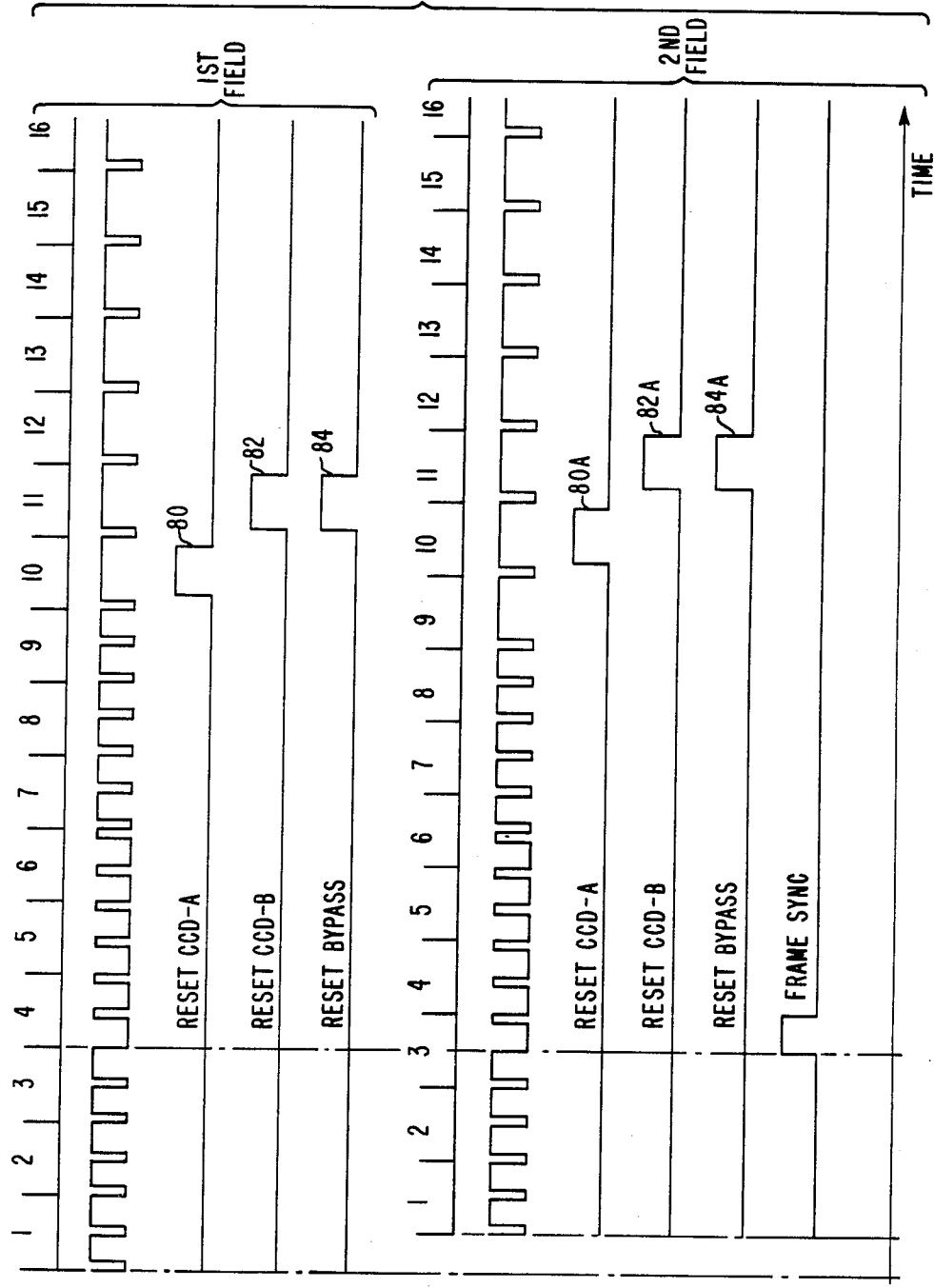

TV SCRAMBLER/DESCRAMBLER USING SERIAL MEMORIES

BACKGROUND OF THE INVENTION

1. Field of the Invention

The invention relates to TV scrambling/descrambling devices and more specifically to scrambling/descrambling devices utilizing serial memories such as charge coupled devices.

2. Description of the Prior Art

Scramblers and descramblers for television signals in which the beginning and end portions of the lines of the video signal are interchanged for scrambling are well known in the art. For example, such a device is disclosed in a patent issued to H. B. Shutterly, U.S. Pat. No. 4,070,693 and assigned to the same assignee as this application. While the apparatus disclosed by Shutterly functions for its intended purpose, it is relatively complex due to the necessity for providing random access memories to store the samples representing the video data.

SUMMARY OF THE INVENTION

The preferred embodiment of the invention comprises a system for scrambling or descrambling a video signal. The system includes first and second serial memories such as charge coupled devices, for example. Data representing adjacent portions of the signal is alternately stored in the two devices with the device into which information is not being currently inputted recirculated for a predetermined time interval to interchange with respect to time the data stored therein. The data output signal of the memory which is currently being used to store data is merged with synchronizing data to form a composite video output signal. In the scramble mode, the time interval is determined by a random number generator. Similarly, in the descramble mode, the time interval is determined by a random number generator synchronized with the random number generator used in scrambling.

BRIEF DESCRIPTION OF THE DRAWINGS

FIG. 4 is a waveform diagram illustrating the timing intervals for the restoration of the DC level of the video signal.

DESCRIPTION OF THE PREFERRED EMBODIMENT

Figure 1:
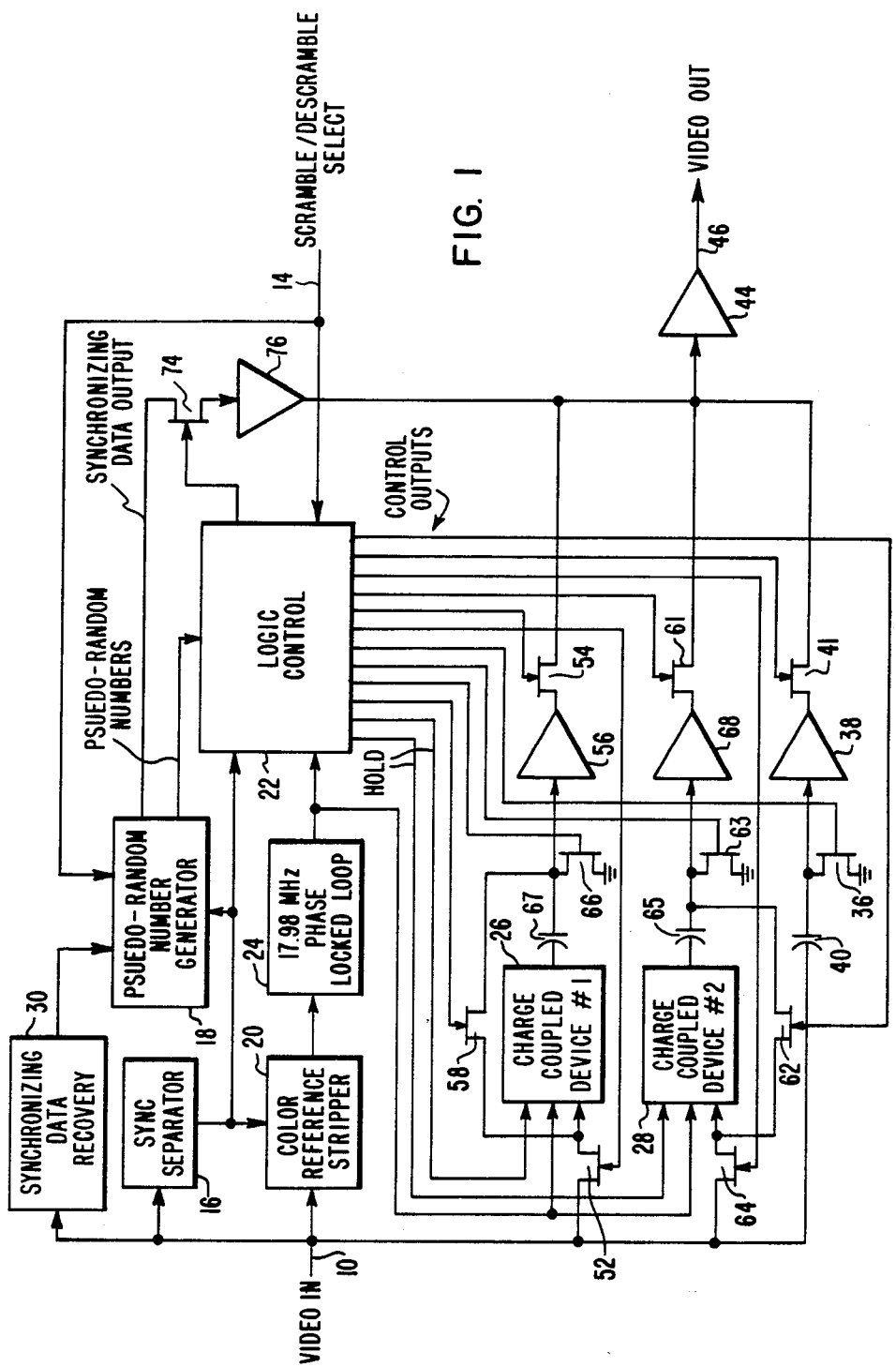
FIG. 1 is a block diagram of the preferred embodiment of the invention.

A scrambler/descrambler system comprising the preferred embodiment of the invention is illustrated in FIG. 1. The system illustrated in FIG. 1 can function either as scrambler or a descrambler. Operation with respect to the scramble cycle will be first described and then the descramble operation will be subsequently described.

In the scramble mode, a standard TV video signal such as the signal illustrated at reference numeral 12 (FIG. 2) is coupled to the input lead 10. Additionally, a scramble signal is coupled to the scramble/descramble select terminal 14 to indicate that the system is to operate in the scramble mode.

In the scramble mode the TV video signal 12 is coupled to a sync separator 16 which recovers the horizontal, vertical and color burst signals. Pseudo random number generator 18 utilizes the synchronizing signals to control the generation of random numbers for scrambling, as subsequently described. The synchronization signals are also coupled to a color reference stripper circuit 20 and to the logic control circuit 22. Color reference stripper circuit 20 recovers the color reference signal and couples this signal as an input to a phase lock loop 24 to generate a signal which is five times the frequency of and phase locked to the color burst, i.e. $\approx 17.9$ MHz. The 17.9 MHz output signal of the phase lock loop 24 is coupled to the logic control circuit 22 and to the charge coupled devices 26 and 28 as a clock signal.

Pseudo random number generator 18 generates two outputs. The first output is a pseudo random number which is coupled to the input of the logic control circuit 22 to determine the duration of the time interval during which the data stored in one of the memories is recirculated. The second output is a synchronizing code to synchronize the descrambler with the scrambler.

In response to the synchronizing data of the video signal, the 17.9 MHz phase lock loop output signal and the pseudo random numbers from the pseudo random number generator 18, the control logic 22 generates signals which control the shifting of data into the charge coupled devices 26 and 28 (serial memories) and selectively combines the output signals of the charge coupled devices, 26 snd 28, to form the scrambled signal 13. Additionally, the logic control circuit 22 generates the signals necessary to insert the synchronizing data for the descrambler into a line of the scrambled signal, for example an unused line of the vertical blanking interval.

Figure 2:
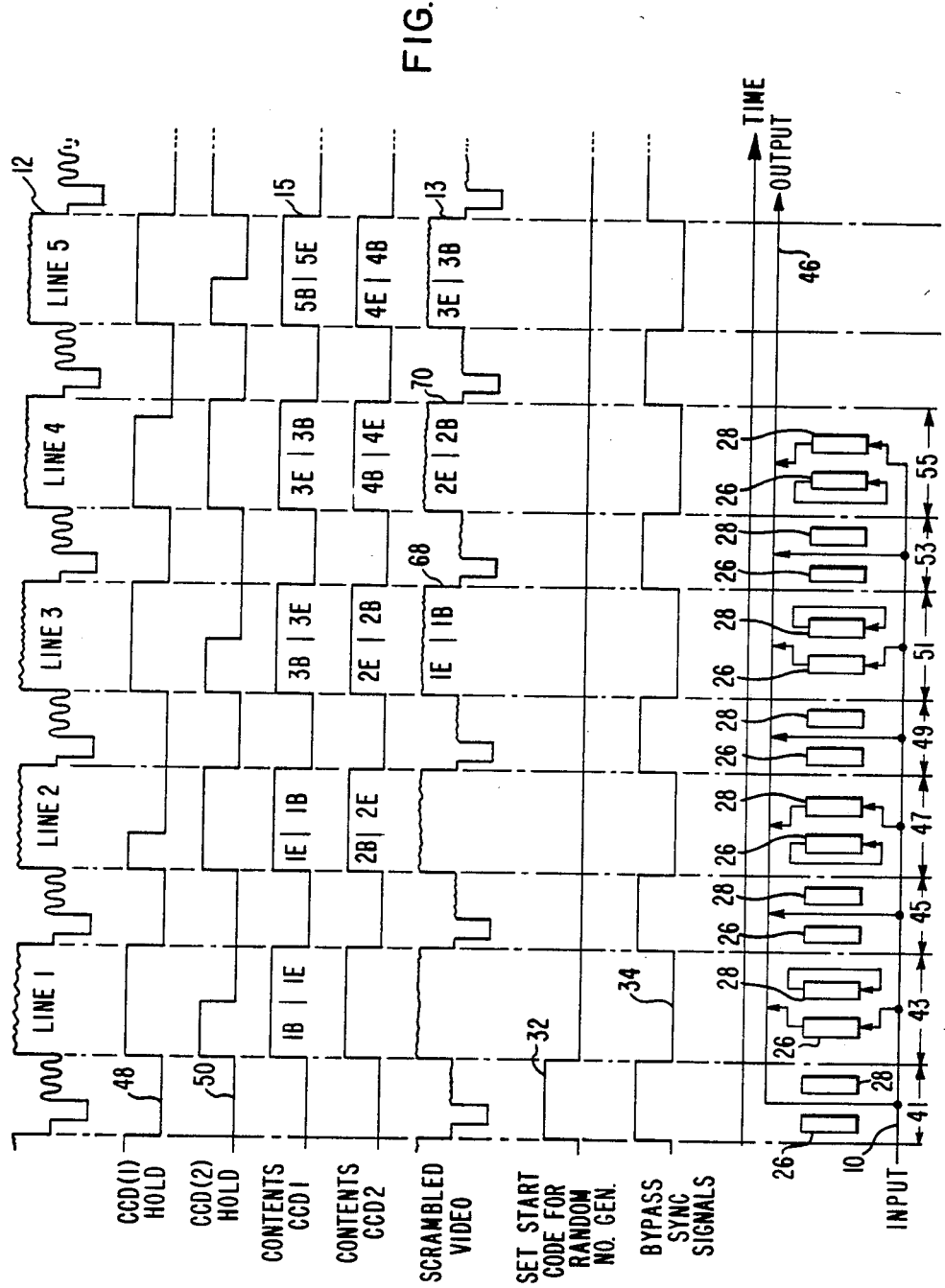
FIG. 2 is a waveform diagram illustrating the operation of the preferred embodiment of the invention.

FIG. 2 is a waveform diagram illustrating the operation of the system shown in FIG. 1. As previously discussed, in the scramble mode the unscrambled TV video signal 12 is coupled to the input lead 10 of the scrambler. A synchronizing data recovery circuit 30 also receives the TV video input signal, but is inactive in the scrambling mode.

Following the detection of the first horizontal synchronizing pulse of the first field of the TV video input signal by the sync separator circuit 16, the bypass sync signal 34 (FIG. 2) switches to the high level. This turns off a switching transistor 36 causing the TV video input signals to be coupled to the input of an amplifier 38 through a coupling capacitor 40. Coincident with the bypass sync signal 34 is a signal coupled to the gate of field effect transistor 41 which turns this transistor on. This couples the horizontal synchronizing pulse and the following color burst signals from the input line 10 to the output line 46 through coupling capacitor 40, amplifier 38, switching transistor 41 and amplifier 44. For each subsequent time interval corresponding to the horizontal synchronizing pulse and the color burst signal, the synchronizing data and the color burst signal are similarly coupled from the input line 10 to the output line 46 as indicated by the time intervals during which the bypass signal 44 in FIG. 2 is at the high level.

The data path from the input line to the output, during the bypass time interval is indicated at reference numeral 41. For example, there is no input to or output from either memory 26 or 28 during this time interval and the input line 10 is coupled directly to the output line 46.

At a time substantially coincident with the leading edge of the video information corresponding to the first line of the video signal 12, control logic circuit 22 changes the value of the hold signal 48 for CCD device 26 to switch to its high value. Coincident with the change of the hold signals 48 to its high value, field effect transistors 52 and 54 are turned on respectively coupling the video signal to the data input of CCD device 26 and the output signal of analog amplifier 56 to the vidoe output terminal 46 through amplifier 44. Similarly, field effect transistors 58 and 66 are turned off, permitting the data output signal of charge coupled device 26 to be coupled to the input of amplifier 56. The high level of the CCD 1 hold signal 48 in conjunction with the 17.9 MHz clock signal causes the first CCD device 26 to shift and store therein a data signal representing the video portion of the first line of the video signal 12.

Substantially coincident with the beginning of the video portion of the first line of the video signal 12, the hold signal 50 for the second charge coupled device 28 also goes high. The high level of the hold signal 50 for the charge coupled device 28, control logic circuit 22 generates control signals which turn on a field effect transistor 62 coupling the output signal of the second charge coupled device 28 to the input of this device. Coupling transistors 61 and 64 are also turned off, decoupling the output of analog amplifier 68 from the input terminal of amplifier 44 and decoupling the video input signal from the data input signal terminal of the second charge coupled device 28. During the time which the hold signal 50 for the second charge coupled device 28 is high, the 17.98 MHz clock signal shifts the second charge coupled device 28 and recirculates the output signal to the input terminal. During the first line of the video signal, the time interval during which the hold signal 50 for the second charge coupled device 28 remains high, corresponds to a time interval less than the time interval corresponding to the video portion of line 1 thereby interchanging the beginning and end portions of the data stored in charge coupled device 28. The duration of this time interval is determined by the pseudo random number generator 18. The data paths between the input line 10 and the output line 46 are illustrated at reference numeral 43 with respect to charge coupled devices 26 and 28.

Detection of the horizontal sync pulse corresponding to the second line of the video signal causes the bypass sync signal 34 to switch to its high level, coupling the horizontal sync pulse and the color burst corresponding to the second line of the video from the data input line 10 to the video output line 46 through coupling capacitor 40, amplifiers 38 and 44 and switching transistor 41 as previously described with reference to the first line of the video signal 12. The data paths for this bypass cycle are illustrated with respect to charge coupled devices 26 and 28 at reference numeral 45.

Coincident with the beginning of the video portion of the second line of the video signal, CCD hold signal 48 goes high. The high level of the CCD hold signal 48 in conjunction with the 17.98 MHz clock signal causes the first CCD device 26 to shift. During this shifting interval control logic circuit 22 couples a signal to transistor 58, turning this transistor on, coupling the output signal of the first charge coupled device 26 to its input. Also transistors 52, 54 and 66 are turned off decoupling the video input signal from the first charge coupled device 26 and decoupling the output signal of the first charge coupled device 26 from the video output signal line 46. Also, coincident with the beginning of the video portion of the second line of the video signal, the CCD hold signal 50 for the second charge coupled device 28 goes high causing this device to shift at a 17.98 MHz clock rate. Coincident with the shifting of the second charge coupled device 28, the control logic circuit 22 turns off the feedback transistor 62, decoupling the output of the second charge coupled device 28 from the input of this device. Transistors 61 and 64 are also turned on, coupling the output signal of the second charge coupled device 28 to the video output terminal 46 through coupling capacitor 65, amplifier 68, switching transistor 61 and amplifier 44 and coupling the video signal 12 to the input terminal of the second charge coupled device 28. The data path during the video portion of the second line is illustrated at reference numeral 47 with respect to charge coupled devices 26 and 28. It should also be noted that at the end of the second line of the video signal 12, the contents of the first charge coupled device 26 are data representing the video portion of the first scan line with the end portion and beginning portion interchanged, as illustrated in FIG. 2 at reference numeral 15. Random number generator 18 determines the time interval during which the charge coupled device CCD 1 hold signal 48 is high and thus duration (length) of the beginning and end segments of the data representing the first line. In FIG. 2, the beginning and end segments of line 1 are respectively identified as 1B and 1E.

Although the output signal of the second charge coupled device 28 is coupled to the output lead 46, no usable video is generated because the video signal representing the first line remains stored in the first charge coupled device 26.

Detection of the horizontal sync pulse corresponding to the third line of the video signal 12 by the sync separator 16 causes the logic control circuit 22 to again switch the bypass sync signal 34 to its high level, bypassing the synchronizing data corresponding to the third line of the video signal from the video input line 10 to the video output line 46 through coupling capacitor 40, amplifier 38, switching transistor 41 and amplifier 44. The data path for this bypass cycle is illustrated with respect to the charge coupled devices 26 and 28 at reference numeral 49.

Substantially coincident with the beginning of the video portion of the third line of the video signal, logic control circuit 22 switches the CCD 1 hold signal 48 to its high value causing this device to begin shifting. CCD 1 hold signal 48 is maintained high for the entire interval corresponding to the video portion of the third line of the input signal 12. This stores data representing the third line of the video signal 12 in the first charge coupled device 26 and shifts to the video output terminal 46 data representing the first line of the video signal with the end and the beginning portion of the video data representing the video line interchanged, as illustrated at reference numeral 68 (notations 1E and 1B respectively representing the end and beginning portions of the side of the first line of the frame). During this interval, switching transistors 52 and 54 are turned on and transistors 58 and 66 are turned off. Simultaneously, data representing the third line of the video signal is stored in the first charge coupled device 26. Also, substantially coincident with the leading edge of the video portion of the third line of the video signal 12, the CCD 2 hold signal 50 is switched to its high level for a time interval determined by random number generator 18, by the control logic circuit 22. Transistors 61 and 64 are turned off and transistor 62 is turned on, coupling the output of the second charge coupled device 28 to the input of this device and decoupling the output of the second charge coupled device 28 from the video output terminal 46. This interchanges the beginning and end portions of the data representing the second line of the video signal, as illustrated in FIG. 2. The data paths are illustrated with reference to the charge coupled devices 26 and 28 at reference numeral 51 (FIG. 2).

Detection of the horizontal sync pulse corresponding to the fourth line of the video signal 12 by sync separator circuit 16 initializes the logic control 22 to again turn on the bypass circuit, bypassing the synchronizing portion of the fourth line of the video signal 12 from the video input line 40 to the output line 46 in a fashion identical with the previous lines of the video signal 12. The data path for this bypass interval is illustrated with reference to charge coupled devices 26 and 28, at reference numeral 53.

Substantially coincident with the beginning of the video portion of the fourth line of the video signal 12, CCD hold signal 48 again is switched to its high level causing charge coupled device 26 to begin shifting. Transistors 52 and 54 are turned off, decoupling the video signal from the input of the first charge coupled device 26 and decoupling the output of this device from the output signal line 46. Transistor 58 is turned on, recirculating the output signal of the first charge coupled device 26 to the input for a time interval determined by the random number generator 18. Thus, during the fourth line of the video signal 12, the video data representing the third line of the video signal is recirculated to store in the first charge coupled device 26 the data representing the third line of the video signal 12 with the input and output portions of this data being interchanged.

Also substantially coincident with the beginning of the video portion of the fourth line of video signal 12, CCD 2 hold signal 50 also switches to its high level value enabling shifting of the second charge coupled device 28. During this interval, bypass transistor 62 is turned off, switching transistors 61 and 64 are turned on, coupling the data output signal of the second charge coupled device 28 to the video output terminal 46 through capacitor 65, amplifier 68, transistor 61 and amplifier 44. This couples to the video output terminal 46 video data representing the second line of the video signal 12 with the ending and beginning portions of this interchanges as illustrated at reference numeral 70 of FIG. 2. As the second CCD device 28 is shifted, data representing video portion of line 4 is stored in the second charge coupled device 28. The data paths utilized during the video portion of the fourth line of the video signal are illustrated at reference numeral 55 of FIG. 2.

The above operation is repeated for each line of the video signal to totally scramble the entire video signal with the video portion of each line being interchanged, with the point of interchange being determined by the pseudo random number generator 18.

Figure 3:
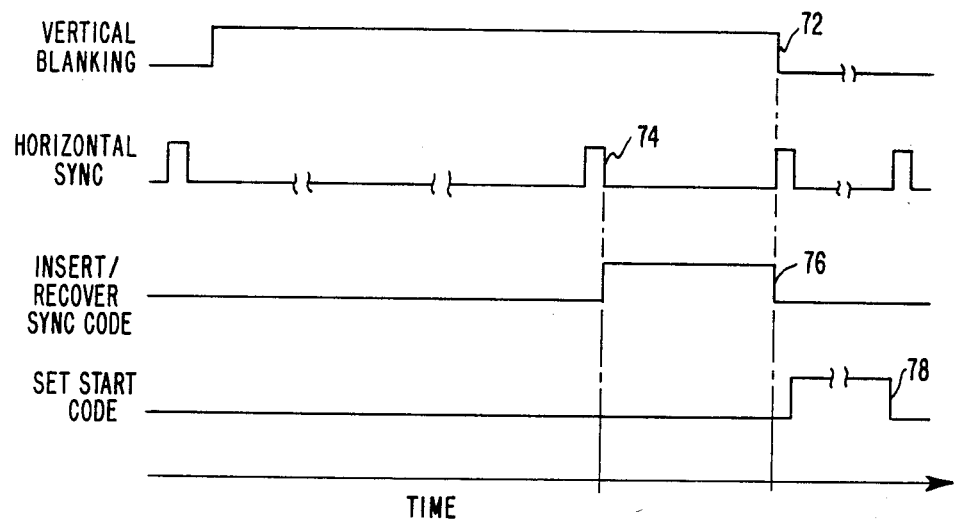
FIG. 3 is a waveform diagram illustrating the location within the TV signal of the synchronizing data for the pseudo random number generator.

FIG. 3 is a waveform diagram illustrating how the pseudo random number generator at the scrambler and descrambler is synchronized. In the scrambling mode, a horizontal sync pulse occurring during the vertical blanking interval 72, for example the pulse illustrated at reference numeral 74, is detected by the control logic circuit 22 to initiate a signal which turns on a switching transistor 74 (FIG. 1) to couple a serial digital code representing the starting point for the pseudo random number generator 18 through an amplifier 76 to the input of amplifier 44 and to the video output signal line 46. At the descrambler, the synchronizing data signal occurring during the corresponding line of the vertical blanking interval is detected by the synchronizing data recovery circuit 30 and coupled to the pseudo random number generator 18 to start this generator at the proper point during the first horizontal line following the vertical blanking interval. Typically, the starting point of the random number generator is set during the first line following the reception of the starting point data, as indicated at reference numeral 78. This causes the pseudo random number generator 18 to start at the correct point.

Except for the synchronizing of the pseudo random number generator 18, the control of the charge coupled devices 26 and 28 are identical for scrambling and descrambling. Similarly, the control of the bypass path for the synchronization portions of the signals is also identical. That is to say, if an unscrambled video signal is coupled to the video input terminal 10, a scrambled video signal will be produced at the output terminal 46. Similarly, if a scrambled video signal is coupled to the input line 10, a descrambled video signal will be produced at the output line 46. Thus, the above description of the control of these devices as illustrated in FIG. 2 is equally applicable to either scrambling or descrambling with the only difference between these two cycles being the synchronization of the pseudo random number generator 18 as described above and the state of the scramble/descramble select signal.

Amplifiers 38, 44, 56 and 68 (FIG. 1) are normally DC coupled amplifiers. Additionally the output signals from the charge coupled device 26 and 28 normally have a DC component which may vary with time for a particular charge coupld device and almost certainly varies from device to device. This being the case, it is necessary to include some method for accurately controlling the DC level of the video output signal of the scrambler/descrambler system.

FIG. 4 is a timing diagram for the DC restoration cycle which is utilized to assure the proper DC level for the video output signal. More specifically, during the vertical blanking interval, the stored charge in coupling capacitors 40, 65 and 67 (FIG. 1) is adjusted to force the DC level of the video output signal to be equal to the black level of the TV video signal 12 during an unusual line of the vertical blanking interval. In the experimental model this was accomplished during the tenth and eleventh lines of the vertical blanking interval.

Shifting of data into the charge coupled devices 26 and 28 continues during the vertical blanking interval. Following the vertical sync pulse, the normal TV video signal 13 is a constant black level except for the horizontal sync pulses and the equalization pulses. This results in substantially all of the data stored in the charge coupled devices 26 and 28 representing the normal black level during substantially the entire vertical blanking interval.

During the tenth line of the vertical blanking interval for the first field, a reset charge coupled device No. 1 signal, illustrated at reference numeral 80, is generated. This signal turns off transistors 54 and 58 and turns on transistor 66. A voltage of approximately zero volts DC is established at the input terminal of amplifier 56 by transistor 66. Substantially all of the data stored in charge coupled device 26 also represents the block level of approximately zero volts DC. As charge coupled device 26 is shifted, coupling capacitor 67 is charged, as necessary to establish the proper black level for the video output signal for any data stored in the first charge coupled device 26. The output impedance of the charge coupled device 26, coupling capacitor 67 and the input impedance of amplifier 56 are selected so that there is minimal shift in the DC level of the video signal for the remainder of the field.

During the eleventh line of the vertical blanking interval, coupling capacitor 65 is similarly charged by shifting the second charge coupled device 28 and turning on transistors 63 and 64, as indicated by pulse 82. Coupling capacitor 40 for the sync bypass path is similarly charged to produce the proper black level by turning on transistor 36 during the eleventh line as indicated at reference numeral 84 of FIG. 4.

Resetting of the coupling capacitor during the second field is essentially identical to the first field. For example, the reset signals for charge coupled devices 26, 28 and 40 are illustrated at reference numerals 80A, 82B, and 84A. The same reference numerals used for the first field followed by an A are used to emphasize the similarity of these signals.

Although the invention has been described above with reference to two serial memories each capable of storing data representing the video data of a single scan line, it is obvious that other memory configurations could be used. For example, each memory could store video data representing two lines. Alternatively, memories storing only a half line could be used. Other frequencies for the clock signal for the charge coupled device could also be used. However, it is believed preferable that it be phase locked to the color burst to reduce color distortion. It should also be noted that it is not necessary to determine the duration of the segments of the video lines representing the scramble data on a random basis. However, the random basis does result in a more secure signal.

The system can be assembled from standard commercial components using well known construction techniques. Therefore no detailed circuit diagram of parts list is included.

We claim:

1. Apparatus for scrambling a TV video signal comprising:
    (a) at least first serial storage means for storing data representative of selected portions of said TV video signal during at least a first selected time interval;
    (b) at least second serial storage means for storing data representative of a selected portion of said TV video signal during at least a second time interval;
    (c) at least first circuit means for recirculating data stored in said at least first serial storage means during a predetermined portion of said at least second time interval;
    (d) at least second circuit means for recirculating data stored in said at least second serial storage means during a predetermined portion of said at least first time interval; and
    (e) circuit means for combining the output signals of said at least first and second serial storage means respectively during said at least first and second time intervals with the synchronizing data of said video signal to produce a scrambled video signal.

2. Apparatus scrambling a TV video signal in accordance with claim 1 further including apparatus for inserting data into a normally unused line of the vertical blanking interval, said data enabling a descrambler to determine the duration of said predetermined portion of said first and second time intervals.

3. Apparatus for scrambling a TV video signal in accordance with claim 2 further including apparatus for changing the time duration of said predetermined portions on a random basis.

4. Apparatus for scrambling a TV video signal in accordance with claim 3 wherein the time duration of said predetermined portion is determined by a random number generator.

5. Apparatus for scrambling a TV video signal in accordance with claim 4 wherein said random number generator is updated at the line rate of said video signal.

6. Apparatus for scrambling a TV video signal in accordance with claim 5 wherein said storage means is a charge coupled device.

7. Apparatus for descrambling a scrambled TV video signal comprising:
    (a) at least first serial storage means for storing data representative of selected portions of said video signal during at least a first selected time interval;
    (b) at least second serial storage means for storing data representative of a selected portion of said video signal during at least a second time interval;
    (c) at least first circuit means for recirculating data stored in said at least first serial storage means during a predetermined portion of said at least second time interval;
    (d) at least second circuit means for recirculating data stored in said at least second serial storage means during a predetermined portion of said at least first time interval; and
    (e) circuit means for combining the output signals of said at least first and second serial storage means respectively during said at least first and second time intervals with synchronizing data of said video signal to produce said descrambled signal.

8. Apparatus for descrambling a TV video signal in accordance with claim 7 wherein said serial storage means is a charge coupled device.

* * * * *